United States Patent [19]

Nick

[11] 3,794,759

[45] Feb. 26, 1974

[54] MULTI-TERMINAL COMMUNICATION APPARATUS CONTROLLER

[75] Inventor: Howard H. Nick, Poughkeepsie, N.Y.

[73] Assignee: International Business Machines Corporation, Armonk, N.Y.

[22] Filed: Dec. 26, 1972

[21] Appl. No.: 317,903

[52] U.S. Cl. .......................... 178/68, 178/3, 325/53, 333/6, 340/167 P

[51] Int. Cl. .......................... H04l 11/15, H03r 5/13

[58] Field of Search........ 178/2 R, 2 D, 3, 66 R, 68, 178/53, 69.5 R; 333/6, 10; 340/147 R, 163, 167 P, 170, 167 R, 146.3 ED; 179/15 BD, 15 AQ; 325/53

[56] References Cited

UNITED STATES PATENTS

| | | | |
|---|---|---|---|
| 3,040,130 | 6/1962 | Hughes | 178/53 |
| 3,086,178 | 4/1963 | Boyd, Jr. | 333/6 |
| 3,516,065 | 6/1970 | Bolt et al. | 178/68 |
| 3,543,188 | 11/1970 | Livingston | 333/6 |
| 3,688,036 | 8/1972 | Bland | 340/167 P |
| 3,715,496 | 2/1973 | Jones, Jr. | 178/66 R |
| 3,736,374 | 5/1973 | Gargini | 333/6 |
| 3,742,452 | 6/1973 | Audretsch, Jr. et al. | 340/163 |
| 3,271,738 | 9/1966 | Kamentsky | 340/146.3 ED |

*Primary Examiner*—Thomas A. Robinson
*Attorney, Agent, or Firm*—Harold H. Sweeney, Jr.

[57] ABSTRACT

A multi-terminal communication apparatus controller is provided which allows information signals on a transmission medium to be replaced with new information signals at each terminal. Branch information signals are obtained from the main transmission medium by coupling without destroying or interrupting the propagation of the information signals on the transmission medium. These branch information signals are converted into terminal signals compatible with the terminal. New information signals are coupled from the terminal to a send branch line where they are converted into send information signals which are coupled onto the transmission medium. The branch information signals are phase inverted when the new information signals are provided. These phase inverted signals are applied to the transmission line so as to cancel the corresponding information signals on the transmission medium. The send information signals are coupled onto the transmission medium in the space left by the cancelled information signals.

11 Claims, 3 Drawing Figures

PATENTED FEB 26 1974 3,794,759

SHEET 1 OF 3

MULTI-TERMINAL COMMUNICATION APPARATUS CONTROLLER

BACKGROUND OF THE INVENTION

This invention relates to a controller for a multiterminal communication apparatus, and more particularly, to a controller which provides for the replacement of information with new information.

In data handling and other communication systems, main data transmission lines having a number of input/output terminals connected thereto have generally become known as transmission or communication loops. At these various terminals, information can be extracted from or added to the main transmission line. In patent application Ser. No. 314,894, filed Dec. 13, 1972, there is shown a multi-terminal digital signal communication apparatus which utilizes directional couplers for coupling the information from a main transmission medium to a controller or terminal and also shows a directional coupler for putting information back onto the main transmission line from the terminal. The information coupled from the transmission line is amplified and placed back onto the transmission line at a position which corresponds to the position of the transmission line signals remaining on the transmission line which gave rise to the coupling from the line. Thus, the transmission line signals are amplified without interrupting the transmission line. The information being sent to the transmission line from any terminal has to be put in an empty time frame usually directly following the end of the time frame of the information which is coupled from the transmission line to the terminal. It will be appreciated that a large number of terminals at which new information can be added will require at least an equal number of empty time frames on the transmission loop to accommodate the new information.

Accordingly, it is the main object of the present invention to provide a controller for a multi-terminal communication apparatus in which the new information directly replaces old information on the transmission medium.

It is a further object of the present invention to provide a controller for a multi-terminal communication apparatus in which the phase of the information signals coupled from the main transmission medium is reversed and reapplied to the transmission medium so as to erase the original information signals.

It is another object of the present invention to provide a controller for a multi-terminal transmission apparatus in which the new information signals from the terminal control the phase reversal of the information signals which are used for erasing.

Briefly, a multi-terminal communication apparatus controller is provided which allows information signals on a transmission medium to be replaced with new information signals from each terminal. Branch information signals are obtained from the main transmission medium by coupling without destroying or interrupting the propagation of the information signals on the transmission medium. These branch information signals are converted into terminal signals compatible with the terminal. New information signals are coupled from the terminal to a send branch line where they are converted into send information signals which are coupled onto the transmission medium. The branch information signals are phase inverted when the new information signals are provided. These phase inverted signals are applied to the transmission line so as to cancel the corresponding information signals on the transmission medium. The send information signals are coupled onto the transmission medium in the space left by the cancelled information signals.

The foregoing and other objects, features and advantages of the invention will be apparent from the following more particular description of an embodiment of the invention as illustrated in the accompanying drawings.

Figure 1:
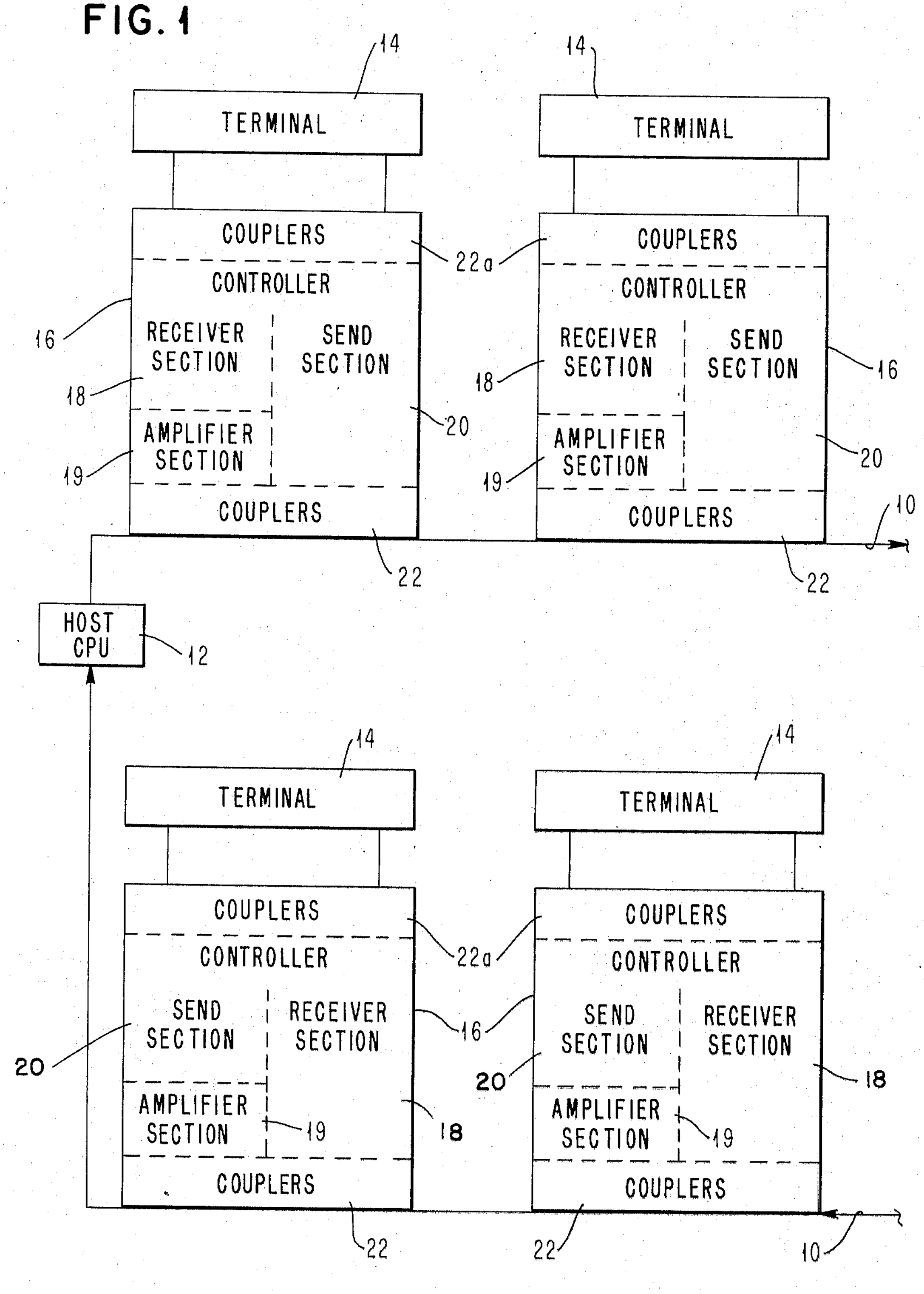
FIG. 1 is a schematic diagram showing the communication loop having a controller at each of the terminals.

The control loop or transmission line 10 shown in FIG. 1 generally consists of a central processing unit or host 12 which sends out information signals along the transmission line 10 to various input/output attachments shown as terminals 14. These information signals are obtained from the line by a controller 16 which is essentially an interface between the transmission line 10 and the input/output attachment or terminal 14. The controller 16 consists of a receiver section 18 for receiving the information signals from the transmission line 10 which may be transmitted to the terminal 14 or put back onto the transmission line 10. The send section 20 of the controller 16 obtains information from the terminal 14 and applies it to the transmission line 10. The transmission line 10 can be a continuous loop or can be a long length of transmission line terminated at some point other than the host CPU 12. The controller 16 which interfaces the transmission line 10 and the terminal 14 is isolated from the transmission line 10 and the terminal 14 by couplers 22 and 22*a* known as stripline directional couplers which have the capability of coupling signals from one line to another without destroying the original signal. Thus, it should be appreciated that the terminal 14 can have a power failure which will not affect the controller 16 or for that matter the transmission line 10. Similarly, the controller 16 can have a failure which will not destroy the information on the transmission line 10. Since the transmission line signal is essentially electrically isolated from the various terminals and controllers, the reliability is very high. The couplers 22,22*a* used to isolate the controller 16 can be directional couplers of the stripline variety which consist essentially of two parallel adjacent printed circuit striplines sandwiched between two ground planes which are inductively and capacitively coupled so that the edges of a first pulse, of fast rise and fall time characteristics, propagating along one line, produce a positive pulse and a negative pulse in the other line. The lines are back coupled or directional in that the thus produced pulses propagate along the second line in a direction opposite to the direction in which the first pulse propagates along the first line. The energy transferred between the coupling segments of the two element directional coupler is affected by the various physical characteristics of the directional coupler such as the length, width and distance between the coupling segments.

Figure 2:
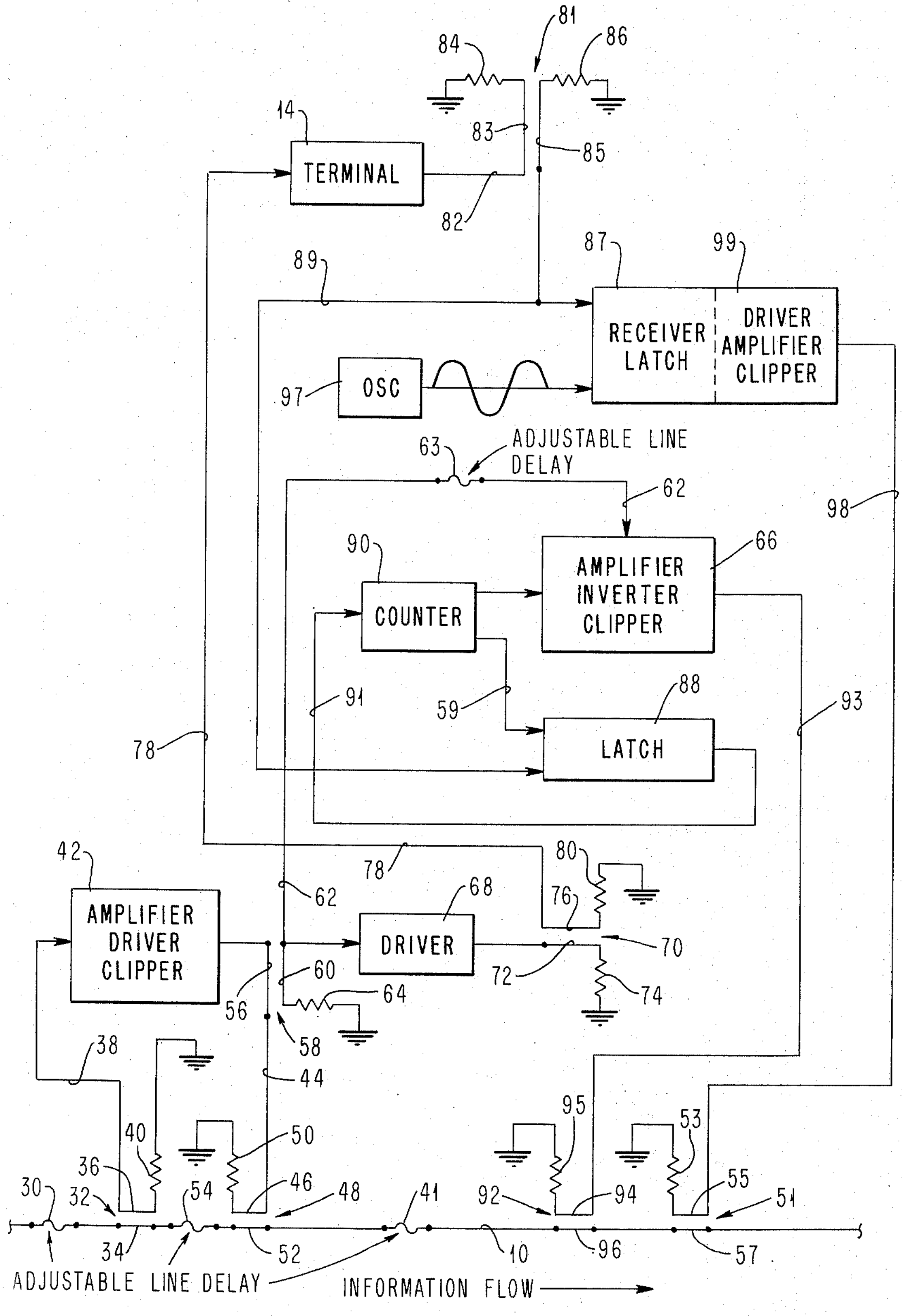
FIG. 2 is a schematic diagram showing the details of the controller as shown in FIG. 1.

Referring to FIG. 2, there are shown the details of the controller 16 including the send and receive sections 20,18 and the couplers 22,22*a* which provide the required isolation. The information signals are placed on the main transmission medium 10 such as a transmission line by the host CPU 12 or by any one of the terminals 14. The information on the main transmission line 10 is in the form of a sinusoidal wave in which one complete period represents a 1 bit of information and no waveform represents a 0 bit as can be seen from waveform A in FIG. 3. The information signals approach the controllers 16 from the left as shown in FIG. 2. The adjustable line delay 30 is provided to adjust the phase of transmission line signal with relation to the position of the coupler 32. The information is obtained from the main transmission line 10 by a directional coupler 32 which is capable of extracting energy from the transmission line signal by coupling without destroying the information on the transmission line. The directional coupler 32, shown schematically, is of the stripline type which has two conductive segments extending parallel to one another. Generally, stripline type conductors are mounted on a substrate made of a non-conductive material such as epoxy glass and are arranged between two ground planes which usually consist of sheets of copper arranged over and under the conductors. One conductive segment 34 of the directional coupler 32 forms part of the main transmission line 10 while the other conductive segment 36 has one end connected to the branch transmission line 38 and the other end terminated by terminating resistor 40. The coupling takes place along the length of the conductive segments 34,36. The coupler operation depends upon the steepness of the incident pulse rise and fall time. The width or duration of the pulse produced by the coupling is determined by the length of the two segments in parallel and the rise time of the incident pulse. The performance of the coupler is related to the impedances offered to signals on the transmission line and the coupling ratio, which are determined by the widths of the lines in the coupled region, the thickness of the lines, the distance between ground planes and the relative dielectric constant of the material. The coupled pulse travels in the opposite direction in the second conductive segment 36 to the direction of travel in the first conductive segment 34, which in this case, forms part of the transmission line 10. A stripline coupler is operated by the edge of the wave passing along one of the lines and this wave edge should have a rise or fall time that is equal to or greater than two times the electrical length of the coupled region in order that the relationship of the height of the induced pulse be related to the height of the driving pulse in the manner defined by the coupling ratio. The waveform coupled to the branch transmission line 38 via the coupler 32 is shown as waveform B in FIG. 3. This waveform is fed to amplifier-driver-clipper 42 where the waveform is amplified and clipped to give the negative pulses as shown in waveform C of FIG. 3. The output of amplifier-driver-clipper 42 travels along the second portion of the branch transmission line 44 which is connected to one end of a conducting segment 46 of a second directional coupler 48. The other end of this conducting segment 46 of the directional coupler 48 is terminated in a terminating resistor 50. The other segment 52 of the directional coupler 48 forms part of the transmission line 10. By means of coupler 48, the signal on the branch transmission line, after being amplified, is coupled back to the transmission line propagating in the same direction as the original information on the transmission line. An adjustable line delay 54 is introduced between the first directional coupler 32 and the second directional coupler 48 so that the amplified version of the signal can be superimposed on the original information remaining on the transmission line 10.

The output of the amplifier-driver-clipper 42 also contains another segment 56 of a directional coupler 58. The other segment 60 of this directional coupler 58 is connected to a further branch line 62 while the other end of the conductive segment 60 is terminated in a terminating resistor 64. The resulting signal following directional coupler 58 shown as waveform D in FIG. 3 forms the input to an amplifier-inverter-clipper 66 and is also fed to a driver 68. The driver 68 transforms the pulses into signals having a sharp rise time and a slow fall time as shown in waveform E of FIG. 3. These pulses are applied to a directional coupler 70 which has one segment 72 connected to the output of the driver circuit 68 and has the other end connected to a terminating resistor 74. The other conducting segment 76 of the directional coupler 70 has one end connected to a further branch line 78 which connects to the terminal or input/output attachment 14. The other end of this conducting segment 76 is terminated in terminating resistor 80. The pulses following the directional coupler 70 have a positive and negative pulse waveform on the branch line 78 going to the terminal 14 which has a positive pulse waveform as shown as pulse waveform F in FIG. 3. The terminal 14 examines the information coming in, for example, it analyzes the address portion and other information contained in the frame of information and then determines if it can modify this particular frame of data or not. If it cannot modify the data, no signals are produced by the terminal and therefore no signal is coupled through coupler 81 and, as a result, no information is put onto the main transmission loop 10 from the terminal 14.

Figure 3:
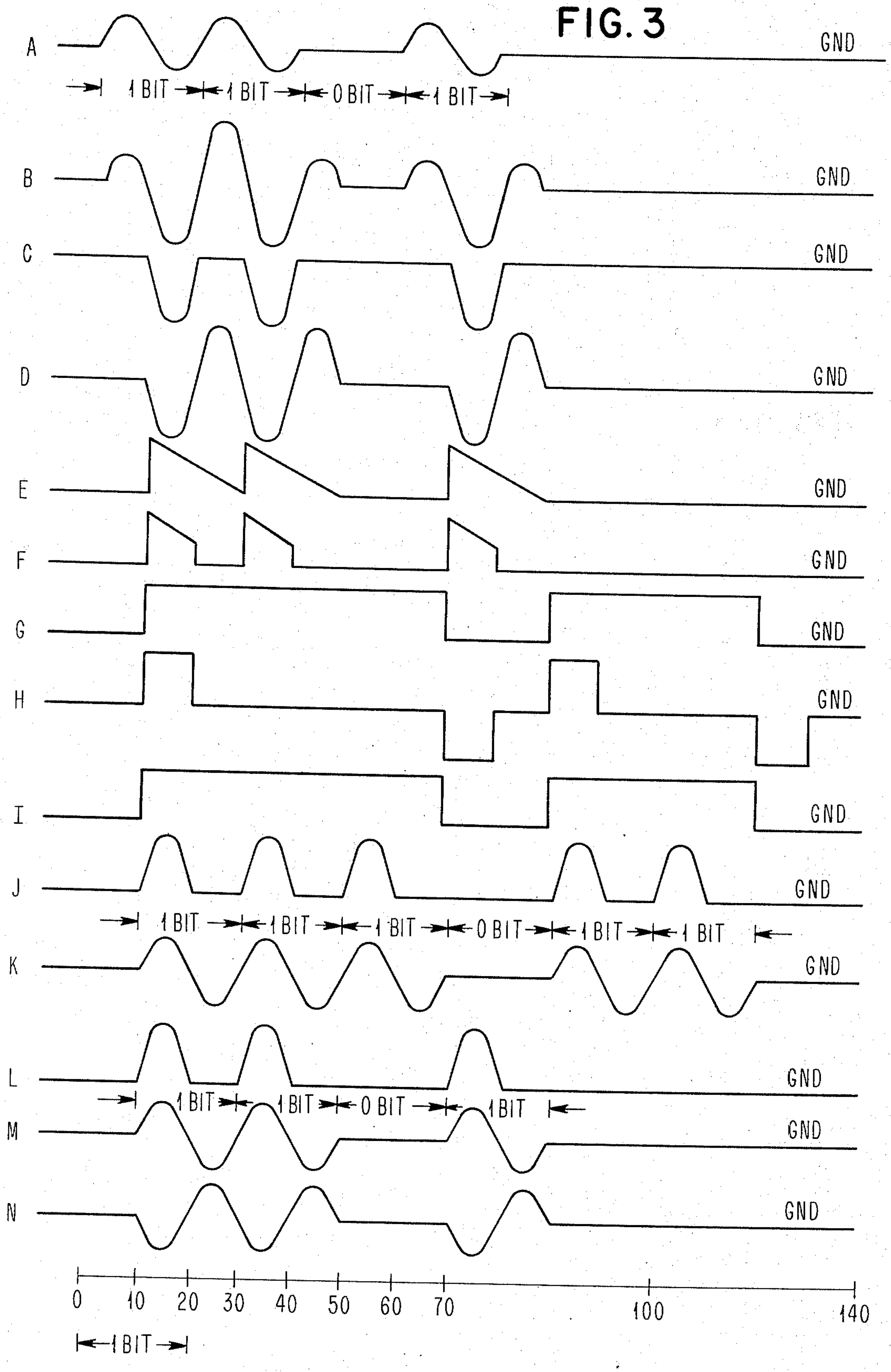
FIG. 3 is a schematic representation showing the waveforms generated in the controller of FIG. 2.

If the terminal 14 wishes to modify or put new information onto the frame of data that it is receiving, it puts the information onto an output line 82 which is connected to one end of a conductive segment 83 of directional coupler 81. This output information will be in the form of pulse waveform G in FIG. 3. The other end of the conductive element 83 is terminated in a terminating resistor 84. The other conductive element 85 of the directional coupler 81 has one end connected to a terminating resistor 86 and the other end connected to a receiver latch 87. The output from directional coupler 81 which is shown as waveform H in FIG. 3 also goes to a latch 88 via connector 89. The first pulse in the frame from the terminal 14 passes through the directional coupler 81 and is applied to both the receiver latch 87 and the latch 88 via line 89 where it energizes latch 88 which, in turn, energizes a counter 90 via line 91. The counter 90 is preset to count the number of pulses which can be in a frame. For example, the frame can contain 90 pulses. Each count from the counter 90 provides a gating pulse to the amplifier-inverter-clipper 66 which allows the successive pulses on the branch information line 62 to pass through the amplifier-inverter-clipper 66 where signals are amplified, clipped and phase inverted. Branch information line 62 includes an adjustable line delay 63 for adjusting the phase of the signal before being amplified, inverted and clipped. This inverted phase signal, shown in waveform L in FIG. 3, is applied to directional coupler 92 via connector 93. The first conductive segment 94 of this coupler is connected at one end to the output line 93 from the amplifier-inverter-clipper 66 and at the other end to a terminating resistor 95. The other conductive element 96 forms a part of the main transmission line 10 downstream from the amplifier section of the controller. The directional coupler 92 is placed in the transmission line 10 with respect to coupler 32 such that the out-of-phase signal when coupled to the main transmission line 10 by coupler 92 causes erasure of the signal remaining on the main transmission line 10 after the coupling out at coupler 32. Waveform M of FIG. 3 shows the signals produced by coupling waveform L through directional coupler 92. It should be noted that waveform M has the opposite phase of waveform N which represents the signals on the main transmission line 10 at coupler 92. An adjustable line delay 41 is provided in the transmission line 10 before the directional coupler 92 to adjust the phase of the transmission line signal with respect to the location of coupler 92.

The pulses from the directional coupler 81, which form the new information, control the receiver latch 87. For example, the first pulse of waveform H of FIG. 3 turns on the receiver latch 87 and the following negative pulse turns off the receiver latch. During the time that the receiver latch 87 is on, (waveform I, FIG. 3), oscillator 97 provides sinusoidal signals representing bits of information which pass through driver-amplifier-clipper 99 onto the output branch line 98. The signals on output branch line 98 are represented by waveform J of FIG. 3. Thus, the terminal pulse type signals are converted to sinusoidal type signals which are more compatible with the signals on the main transmission line 10. Actually, the signals on the output branch line 98 after being coupled to the main transmission line 10 result in sinusoidal type signals (see waveform K of FIG. 3) which are compatible with the other signals on the transmission loop. The output from the driver-amplifier-clipper 99 is connected to a conductive element 55 of a further directional coupler 51 which has the output branch transmission line 98 connected at one end and a terminating resistor 53 connected at the other end. The other conductive element 57 of this directional coupler 51 is part of the main transmission line 10 adjacent the first conductive element. Coupler 51 couples the output of the driver-amplifier-clipper 99 onto the transmission line 10 in the time frame which was erased by the previous directional coupler 92. Thus, new information replaces the old information on the main transmission line.

The last count from counter 90 goes to the latch circuit 88 via connection 59 to de-energize it so that the one frame of information only is passed through the amplifier-inverter-clipper.

It will be appreciated, that the controller 16 destroys the original information passing on the main transmission line by generating an out-of-phase signal which, by means of a directional coupler, causes erasing. Simultaneously, new information is being placed on the transmission line in the same time frame as the erasure took place. The advantage of this modification is that a higher density is possible on a given multi-terminal digital signal transmission loop.

While the invention has been particularly shown and described with reference to a preferred embodiment thereof, it will be understood by those skilled in the art that the foregoing and other changes in form and detail may be made therein without departing from the spirit and scope of the invention.

What is claimed is:

1. A multi-terminal communication apparatus controller which allows information signals on a transmission medium to be replaced with new information signals at each terminal comprising:

a first coupling means for obtaining branch information signals from the transmission medium without destroying or interrupting the propagation of the information signals on said transmission medium;

means for converting said branch information signals into terminal signals compatible with the terminal;

terminal coupling means for coupling new information signals from said terminal to a send branch line;

means for converting said new information signals into send information signals;

means for inverting the phase of said branch information signals under control of said new information signals;

means for coupling said inverted phase signals onto said transmission medium so as to cancel the corresponding information signals on said transmission medium; and means for coupling said send information signals onto said transmission medium in the space left by the cancelled information signals.

2. A multi-terminal communication apparatus according to claim 1, wherein the transmission medium is a transmission line.

3. A multi-terminal communication apparatus controller according to claim 1, wherein said first coupling means is a directional coupler tuned to the frequency of information signals on said transmission medium.

4. A multi-terminal communication apparatus controller according to claim 1, wherein said means for converting said branch information signals into terminal signals comprises a driver for transforming said branch information signals into pulses having a fast rise time and a relatively slow fall time and a second directional coupler for coupling said pulses to said terminal in a positive and negative pulse form.

5. A multi-terminal communication apparatus controller according to claim 1, wherein said terminal coupling means is a terminal directional coupler for producing positive and negative pulses based on the rise and fall time of the new information signals, respectively.

6. A multi-terminal communication apparatus controller according to claim 5, wherein said means for converting said new information signals into said send information signals comprises a receiver latch, a driver-amplifier-clipper and an oscillator, said latch being turned on and off by said positive and negative pulses from said terminal directional coupler, said oscillator providing sinusoidal signals which pass through the open latch and are amplified and clipped to form the send information signals.

7. A multi-terminal communication apparatus controller according to claim 1, wherein said means for inverting the phase of said branch information signals includes a latch circuit turned on by the first pulse of said new information which is the synchronization pulse, a counter preset to a predetermined count determined by the frame length of the information, and an inverter amplifier which is gated by each count of said counter thereby allowing the corresponding information signal of said branch information signals to be amplified and phase inverted, the last gate output of said counter turning off said latch.

8. A multi-terminal communication apparatus controller according to claim 1, wherein said means for coupling said inverted phase signals onto said transmission medium is a directional coupler tuned to said transmission medium information frequency so as to cancel the corresponding information signals on said transmission medium.

9. A multi-terminal communication apparatus controller according to claim 1, wherein said means for coupling said send information signals onto said transmission medium is a directional coupler tuned to said transmission medium information signal frequency.

10. A multi-terminal communication apparatus controller according to claim 1, wherein an adjustable line delay is introduced for said branch information signals so that the phase of the branch information signals can be adjusted before said means for inverting the phase of said branch information signals is applied.

11. A multi-terminal communication apparatus controller according to claim 1, wherein a delay is introduced into the transmission medium for providing the necessary delay of the information signals on the main transmission medium so that the information signals arrive at said coupling means at the same time as said inverted phase signals.

* * * * *